Sept. 30, 1958     T. E. GARDNER     2,854,535
CONTROL DEVICE
Filed Feb. 15, 1954     4 Sheets-Sheet 1
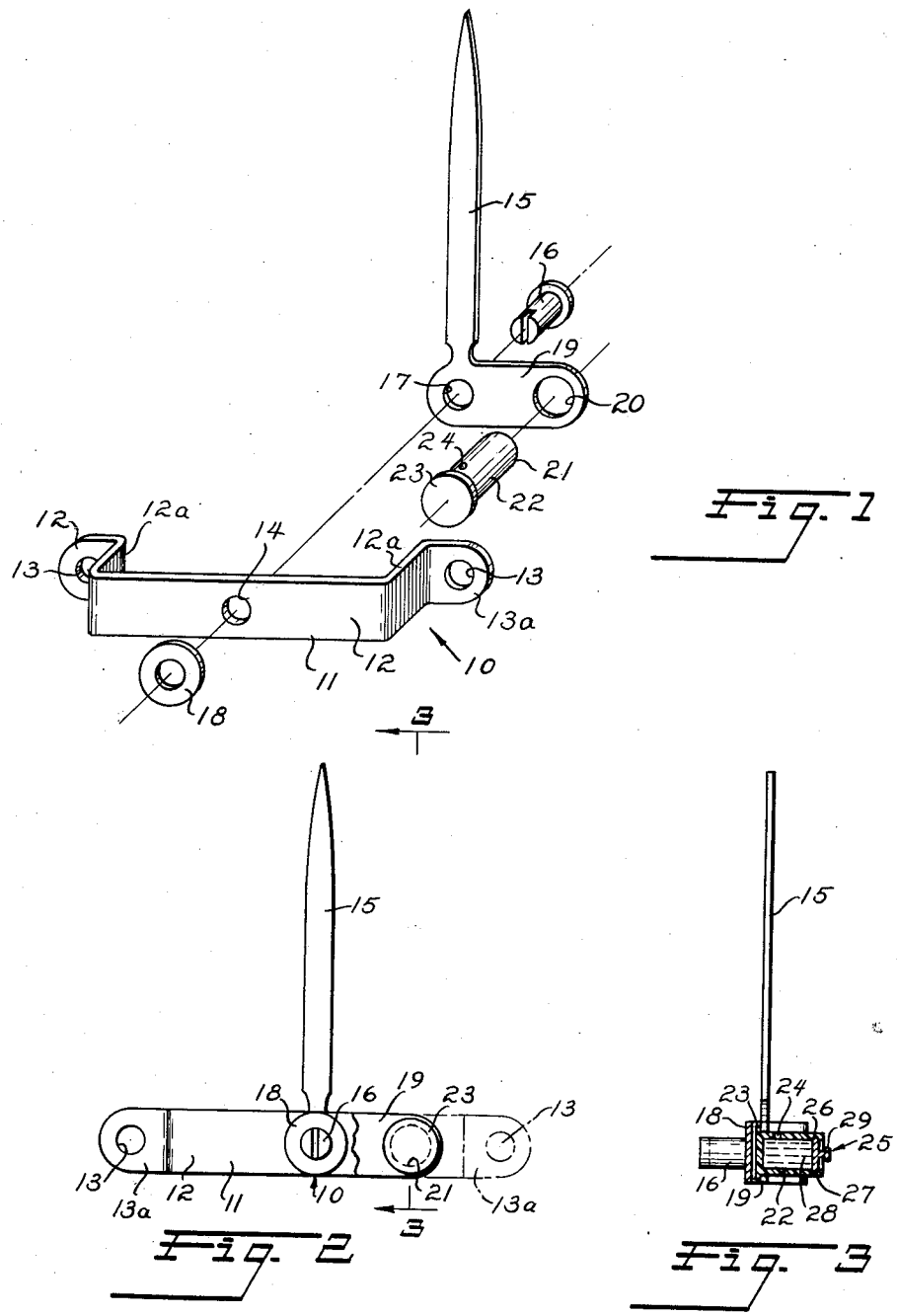
INVENTOR.
THOMAS E. GARDNER
BY
Jones & Young
AGENTS Sept. 30, 1958 T. E. GARDNER 2,854,535
CONTROL DEVICE
Filed Feb. 15, 1954 4 Sheets-Sheet 2
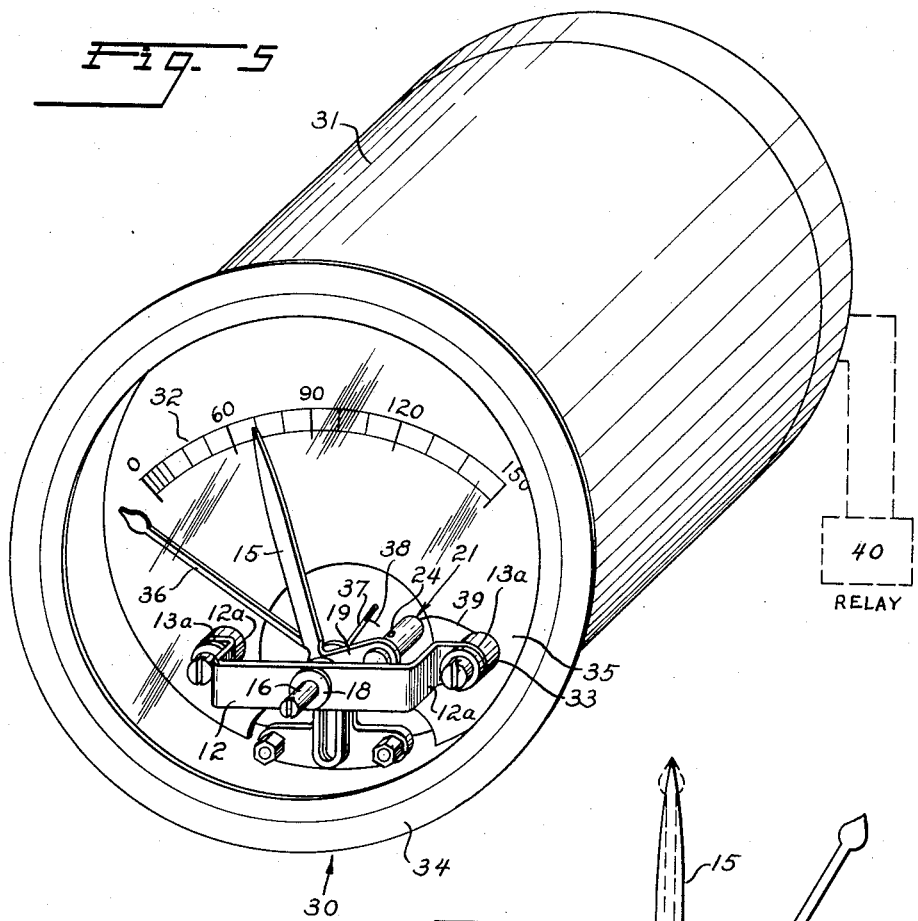
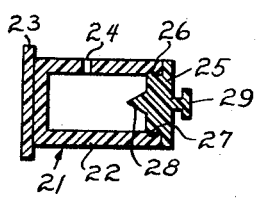
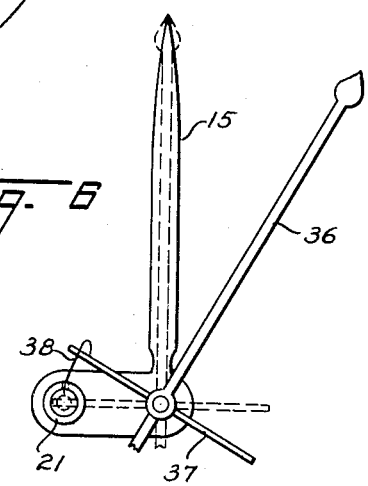
INVENTOR.
THOMAS E. GARDNER
BY
Jones + Young
AGENTS Sept. 30, 1958  T. E. GARDNER  2,854,535
CONTROL DEVICE
Filed Feb. 15, 1954  4 Sheets-Sheet 3
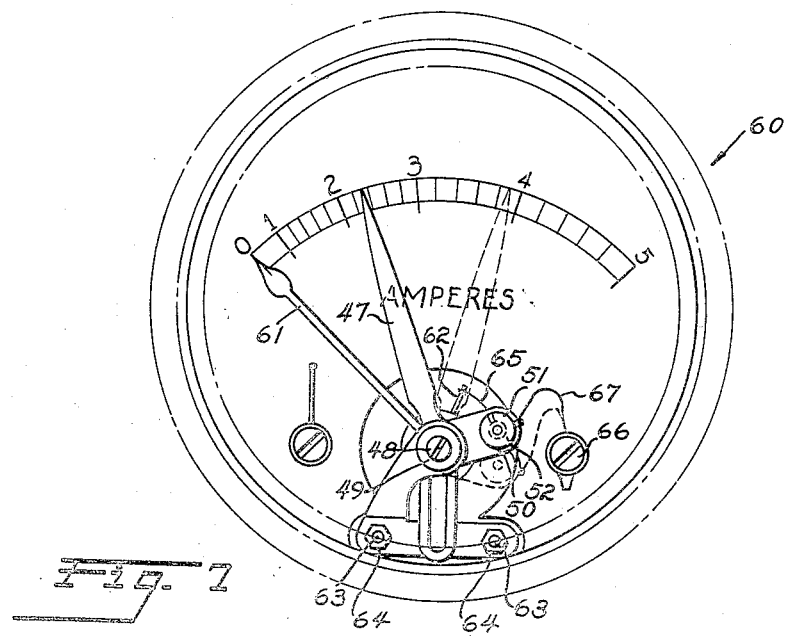
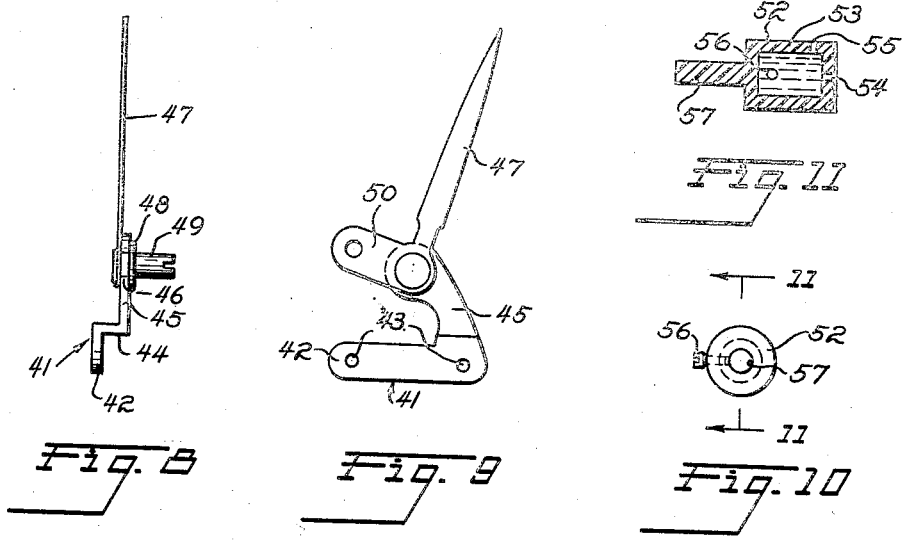
INVENTOR
THOMAS E. GARDNER
BY Jones & Young
AGENTS Sept. 30, 1958    T. E. GARDNER    2,854,535
CONTROL DEVICE Filed Feb. 15, 1954    4 Sheets-Sheet 4

INVENTOR.
THOMAS E. GARDNER
BY
Jones & Young
AGENTS

United States Patent Office 2,854,535
Patented Sept. 30, 1958

2,854,535
CONTROL DEVICE

Thomas Edison Gardner, Raleigh, N. C.

Application February 15, 1954, Serial No. 410,388

23 Claims. (Cl. 200—56)

The present invention relates to a control device and more particularly to a control device for use in supervising, regulating or controlling any operating or producing equipment or any manufacturing operation to either prevent same from functioning either above or below a predetermined value or safety level or for maintaining the operation of the equipment or the like between a predetermined minimum and maximum level.

In the present day operation of processes, equipment, and machinery, it is necessary to provide a wide variety of controls to regulate the operations. Most operations employ an indicating instrument which will visibly indicate the operation of the equipment whether it be an energy-producing, a mechanical mechanism, a heat or light generating operation, or a manufacturing process. If the operation as indicated by the indicating instrument is excessive or sub-normal the operator can then manually adjust the operation of the equipment or process to restore it.

There have been many attempts heretofore made to provide automatic control devices for supervising or controlling such operation and equipment but such attempts have never been completely successful. A great many of such prior control devices have been of an extremely complicated structure and operation such that they were economically unfeasible to employ as well as being operationally undesirable. Another attendant disadvantage of such prior control devices is that they have not been completely and fully automatic in their operation and have required mechanical actuation to maintain full control.

Another major and very serious disadvantage is that such prior controls have been incapable of giving a fine degree of control. It is becoming increasingly more desirable and necessary to control operations and equipment to a very fine degree and within extremely narrow limits in order to obtain the full benefits of the equipment. Similarly, the controls heretofore employed have been electrically actuated regardless of the type of equipment or its operation. As a result, the inherent nature of these prior controls have resulted in an excessive amount of current being required to operate the controls. This is an conomical disadvantage that heretofore has never been overcome. An inherent disadvantage with prior art controls and supervisory devices has been the fact that such control devices have possessed no universal application. As a result the controls have had to be designed and constructed for the particular type of equipment and have resulted in an excessively high cost for such controls.

An example of an operation in which automatic control devices are sorely needed but which have never been successfully produced is in the electric power-producing companies. Each State possesses a State power commission which regulates, controls and supervises the power companies. One regulation existing in every State sets an upper maximum limit of voltage output that may go into the system to prevent an excessive amount of voltage from being passed into the system which would result in damage to the electrical appliances and the like in the homes of consumers as well as machinery and the like in manufacturing plants. This is becoming an increasingly important problem in view of the extensive growth and development of television equipment which is extremely sensitive to high voltage and is easily damaged by same.

These requirements by State power commissions to maintain a maximum upper limit and often a minimum lower limit of power output results quite often in considerable loss of revenue to the power producing companies. This is occasioned by the fact that there is a constant changing demand throughout a 24-hour period in the amount of current or power consumed in any one area. Furthermore, this constant change does not follow any one particular pattern on any given day. Power consumption cannot be estimated or forecast based on the power consumption of any previous day or period. Moreover, there are constantly changing peak load demands from day to day that do not follow any definite or set pattern and cannot be easily forecast. As a result, power companies must of necessity employ voltage regulators of some type in an effort to prevent the voltage output from exceeding the maximum limit of voltage established by the regulatory body. In the use of these voltage regulators, when the instrument is installed in the system at the point of voltage output they are set so as not to permit the output of voltage greater than that value established by the regulatory body. In make such a setting, the power companies can only go on their prior consumption or calculations or forecasted and expected consumption and set the voltage regulator on these figures. However, this has not been the answer since the figures used for the calculations may not in fact give a true picture of future power consumption due to constant changing load centers and increased load that cannot be predicted. Moreover, the peak usage constantly changes from time to time and at any one period it is possible that as a result of this change in peak usage, the voltage will measurably exceed the upper maximum limit authorized by the regulatory commission. Not only when such a condition exists is there a violation of the regulatory board existing but the damaging of appliances and other electrical equipment is likely to occur. The only way that these disadvantages may be eliminated would be by a constant day to day adjustment of the voltage regulators which obviously is economically unfeasible as well as operationally impossible.

As a result, most power companies in order to conform, to State regulatory rules set their peak operation below that which they are authorized to do by the regulatory board. This is economically undesirable to the power companies since it results in a considerable loss of revenue to the company during the periods of the day when there is off peak conditions in power consumption. Thus during off-peak conditions power companies are forced to operate at a lower voltage output than would be necessary if it were not for the fact that they would tend to exceed the authorized upper maximum limit during peak load conditions. This forced operation is particularly undesired by the power company since late at night and early morning during off-peak load conditions a surplus of voltage exists that is not revenue-producing but could so be if a higher minimum load limit was permitted. This expensive operation could be completely eliminated if a narrow band of operational limits between the maximum output and the minimum output could be effected. To this date there have been no controls capable of permitting such an operation.

Another problem that exists in power distribution which requires the need of an automatic control has resulted from the trend by power companies in the installation of static capacitors in their power distribution systems. This trend toward capacitor usage has resulted in a need to permit proper switching in of the capacitors to correct power factor and voltage and to maintain it at its best operating conditions. There are a wide variety of instruments and devices available today for switching capacitors but they are not entirely satisfactory and possess a great many disadvantages. One major disadvantage is that the switching devices are of the heavy burden type and are not suitable for use on customer metering equipment. Moreover, such devices have been cumbersome in structure and quite expensive in cost. Furthermore these prior switching devices do not possess fine control and do not permit ease of adjustment which is quite essential in the effective and proper switching of capacitors. As a a result, the static capacitors in use today are not being properly switched in order to attain the full advantages possessed by such equipment.

This foregoing description of problems attendant to power distribution companies due to the fact that proper control devices have not been heretofore available, is reflected many times over in a wide variety of industries. The present invention is therefore not limited to use only in the power distributing industry but is universal in its application for all industries wherein controls are required. Thus the foregoing discussion is illustrative in character only and is in no way to be considered as a limitation in the use of the present invention to be hereinafter described.

It has been found that a control device is possible which will eliminate all of these foregoing and related disadvantages by providing a control device for association with the indicating instrument normally present on the equipment and process to be controlled. The control device of the present invention is to be mounted on an electrically actuated indicating instrument and will function to control the operation electrically to prevent the operation of the equipment from operating above a predetermined level.

It is, therefore, a principal object in the elimination of the foregoing and related disadvantages to provide a control for association with an indicating device to prevent the operation from functioning above a predetermined limit.

Another object of the present invention is to provide a control that has universal application in any system wherein a maximum control is desired.

A further object of the present invention is to provide a control for association with any current-actuated indicating means for maintaining its operation at a point not to exceed any predetermined limit.

A further object of the present invention is to provide a control for current-actuated indicating means that requires virtually no power in its operation.

A still further object of the present invention is to provide a control for use on current-actuated indicating means that is extremely sensitive and may be controlled within extremely narrow control limits.

A still further object of the present invention is the provision of a control means that is extremely simple in construction and economical and feasible to manufacture.

Another object of the present invention is the provision of a control means that may be secured to existing equipment with virtually no modification required.

Another object of the present invention is the provision of a control that may be associated with a voltmeter used in indicating voltage output of a particular power system to prevent the output of voltage above a predetermined set limit.

A still further object of the present invention is the provision of a control for association with a voltmeter to permit the maximum voltage output permissible under the law without danger of the voltage output exceeding such limit.

Another object of the present invention is the provision of a control for association with a voltmeter that will permit a measurable higher minimum voltage output than heretofore possible with a resulting increase in revenue to the power company.

A further object of the present invention is the provision of a control for switching capacitors in a power system to maintain the desired power factor and voltage output.

Another object of the present invention is the provision of a control for association with the capacitor to switch same in a very simple manner and to provide a high degree of control.

A further object of the present invention is the provision of a control that may be used with indicators recording heat temperature R. P. M., voltage, amperage and the like, to prevent the mechanism or equipment from exceeding a predetermined proper limit.

To the accomplishment of the foregoing and related ends, the present invention then consists of the means hereinafter described and particularly pointed out in the claims, the annexed drawings and the following descriptions setting forth in detail certain means in the carrying out of the invention, certain disclosed means illustrating, however, one of the various ways in which the principle of the invention may be employed.

The present invention, by way of example, is illustrated in the accompanying drawings in which:

Fig. 1 is a perspective view of a control device made in accordance with the present invention illustrating it in disassembled form;

Fig. 2 is a front elevation partly in section of the control device shown in Fig. 1 in assembled form;

Fig. 3 is a side elevation partly in section of the control device shown in Fig. 2;

Fig. 4 is an enlarged cross-sectional view of a fluid receptacle for use in the control device as indicated in Figs. 1–3;

Fig. 5 is a perspective view of the control device made in accordance with the present invention illustrating its mounting on an indicating instrument, i. e., a voltmeter;

Fig. 6 is a rear elevation illustrating the association of the index pointer of the control device with the indicating pointer of an indicating instrument;

Fig. 7 is a front elevation of a modified form of a control device made in accordance with the present invention, illustrating its mounting on an indicating instrument;

Fig. 8 is a side elevation of a modified form of a control device made in accordance with the present invention;

Fig. 9 is a rear elevation of the modified form of a control device illustrated in Fig. 8;

Fig. 10 is an enlarged cross-section of a modified form of a fluid receptacle element;

Fig. 11 is a section taken on lines 11—11 of Fig. 10;

Figure 12:
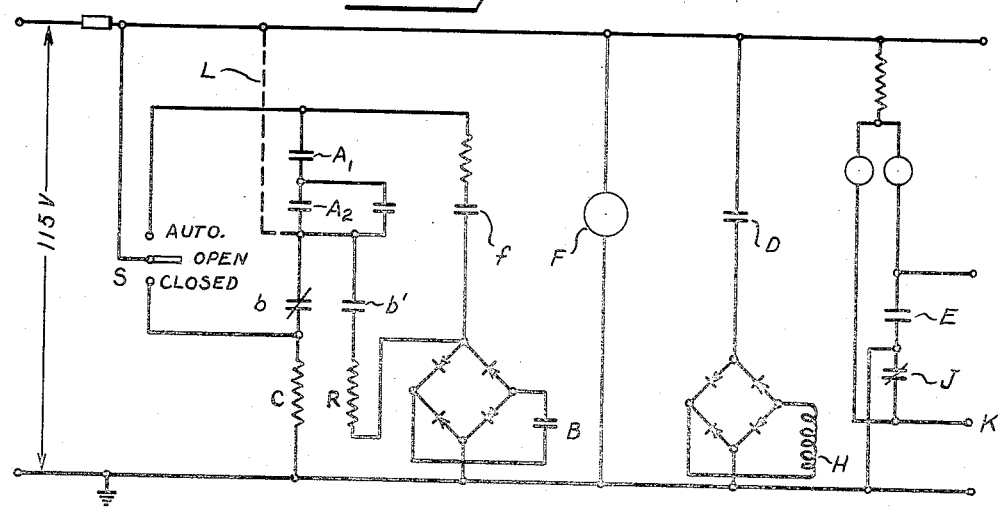
Fig. 12 is a schematic wiring diagram illustrating the operation of a control device made in accordance with the present invention in switching capacitors in a power system.

Referring now to the drawings in detail, and with particular reference to Figs. 1–6, an illustrative embodiment of a control device made in accordance with the present invention, generally designated by reference numeral 10, is shown. The control device 10, as illustrated, comprises an elongated base plate 11 having a center section 12. The base plate 11 has side portions 12a secured to either side of the center section 12 and flanged inwardly at right angles thereto. A foot portion 13a is secured to the free end of each side portion 12a and extending outwardly therefrom at right angles thereto and in a plane parallel to and inwardly spaced from the center section 12. An opening 13 is in each foot portion 13a adjacent each end thereof and will function as the means for mounting the control device 10 to an indicating instrument for operation therewith. The length of the base plate 11 and the spacing of the openings 13 must be such that the plate 11 will be mounted directly to existing elements or mountings on an indicating instrument. This arrangement will be described more fully later herein.

The center section 12 of the base plate 11 is provided with a central opening 14 in which one end of an index pointer 15 is mounted for pivotal movement therein by means of a set screw 16. The positioning of the central opening 14 must be such that it will be in substantial alignment with the pivotal axis around which the conventional indicator arm of an indicating instrument will move. The necessity for this is to positively insure the accurate alignment of the indicating arm with index pointer 15 so that the control device 10 will possess a high degree of accuracy.

The index pointer 15 is provided with an opening 17 at its lower end thereof and is to be in alignment with the opening 14 of the enlarged center section 12 when assembled as hereinbefore indicated. The set screw 16 serves to secure the index pointer 15 in pivotal relationship thereto and will function, as will hereinafter be more fully described, as a manual setting means to set the index pointer 15 at a predetermined value or reading on a conventional indicating instrument. As a result, it will be found advantageous in many instances to provide a washer 18 to prevent the index pointer from "creeping" from its set value. Any suitable washer may be used such as, for example, metal, fiber, or plastic washers although the preferred type is a nylon washer.

The index pointer 15 is provided with an arm 19 adjacent its lower end thereof and extending outwardly therefrom at right angles thereto. The outer free end of the arm 19 is provided with an opening 20 into which a fluid receptacle 21 is to be detachably secured. As indicated, the arm 19 is integrally formed with the index pointer 15 but it is to be understood that this is not essential. However, the arm 19 under such circumstances must be secured to the index pointer 15 in order to be movable therewith. In other words, the arm 19 must be at right angles to and movable with the index pointer 15 for reasons which will be discussed more fully hereinafter in describing the operation of the control device 10.

The fluid receptacle 21 is generally cylindrical in configuration and may be made from any material that is non-conducting, will not warp or sweat when in use. A preferred material is nylon although any suitable material that would satisfy the foregoing requirements, i. e. plastics, would be satisfactory.

The fluid receptacle 21 comprises an elongated cylindrical body section 22 and an enlarged cylindrical head section 23 at one end thereof, the circumference of the head section 23 being greater than that of the body section 22. The body section 22 is provided with a minute opening 24 to permit a contact-making wire or the like to enter into the body of the receptacle 21 and contact the fluid contained therein. The size of the opening or orifice 24 must be such that the fluid contained within the receptacle 21 will not escape therethrough when the control device 10 is in operation and yet be large enough to permit easy entry of a fine wire or the like therethrough. This operation and construction is an extremely important part of the present invention and will be discussed in detail in the operation of the control device 10 given hereinafter.

A metallic cap 25 is detachably secured in very tight engagement to the free end of the body section 22. The metallic cap 25 may be made from any material that is not attacked by or will react with the fluid contained in the receptacle 21. To positively insure the retention of the cap 25 in place it is preferred that the inner peripheral edge of the elongated body 21 immediately adjacent its free end be provided with a circumferential indent 26 into which a circumferential ridge 27 of cap 25 will mate therewith. This construction permits the cap 25 to be snapped into the free end of the elongated body 22 and will be positively held in very tight engagement thereby thus preventing any leaking of fluid therefrom.

The cap 25 serves the purpose of not only providing a cover for receptacle 21 but functions also as an electrical lead. As a result cap 25 is provided with a pointed contact 28 at its forward free end which will serve to break the surface of the fluid within the receptacle 21 thus insuring an electrical connection at all times. For example, when mercury is used as the fluid within the receptacle 21, the pointed contact 28 will penetrate within the fluid, and in the event any oxidation of the mercury occurs, the pointed contact 28 will be within the body of the mercury and will thus be in operating condition at all times. The opposite end of the cap 25 is provided with a contact stud 29 which serves as an electrical terminal contact.

The fluid to be positioned within the receptacle 21 must be of electrical conductivity since the fluid will function, as will be more fully discussed hereinafter, as a circuit-maker and breaker. Similarly, the fluid must be of such nature that it will be unlikely to escape through the orifice 24 when the control device 10 is in use. The fluid best meeting these and other requirements will be found to be mercury. The fluid may be introduced in the receptacle 21 by removal of the cap 25 and filling the receptacle at one end thereof. Similarly, the mercury can be introduced into the receptacle 21 through the opening or orifice 24 by means of a hypodermic needle or the like or any needed replacement of the fluid can be accomplished in this way without disassembling it. It should be noted that the receptacle 21 should be substantially filled with the fluid and be maintained in this state.

The fluid receptacle 21 is preferably positioned in the opening 20 of the arm 19 by a press or friction fit. Thus the circumference of the elongated body section 22 must be slightly larger than that of the opening 20. When the receptacle 21 is so positioned in the opening 20 the rear surface of the enlarged section 23 will be flush against the surface of the arm 19 immediately surrounding the opening 20 thus positively insuring the rigid retention of the receptacle 21 within the arm 19 of the index pointer 15.

Referring now to Fig. 5, the control device 10 just described is shown mounted for operation on a typical voltmeter, generally designated by reference numeral 30. The voltmeter 30 is basically of conventional design and would require very little modification to receive the control device 10 except as described hereinafter. The voltmeter 30 comprises a casing 31 into which the voltmeter mechanism is positioned. The forward end of the casing 31 is open and the dial face 32 is positioned therein by means of spaced dial-face studs 33. A facing ring 34 carrying a crystal face 35 is positioned to the forward free end of the casing 31 and serves as a cover therefor. The voltmeter indicating pointer 36 is mounted on a jewel movement (not shown) and is electrically actuated when the voltmeter is in operation to record the voltage. It is to be clearly understood that the use of a voltmeter is solely for the purpose of illustrating one specific type of instrument which the control device 10 of the present invention may be operated therewith. The control device 10 could be mounted in any indicating instrument of any type wherein the indicator instrument is electrically actuated.

To mount the control device 10 hereinbefore described to a typical voltmeter 30, the facing ring 34 and the crystal 35 are detachably removed from the casing 31 and a small opening is drilled in the crystal face 35, the opening to be in substantial alignment with the pivotal point of the indicating pointer 36. The opening should further be of a size sufficient to permit the set screw 16 to extend outwardly therethrough since the set screw 16 will be outside of the voltmeter 30 in order to permit manual setting of the index pointer 15 without disassembling the voltmeter. It should be cautioned that the opening in the dial face 35 should not be of a size such that it would permit the entry of dirt therein when the set screw 16 is in place.

The voltmeter 30 as ordinarily constructed contains a counter-balance arm 37 secured adjacent to its lower pivotal point to insure that the indicating arm 36 will show an accurate reading. The counter-balance arm 37 is normally provided with minute weights or the like at each end thereof. To utilize the control device 10 of the present invention, the counter-weight on the right-hand arm of the counter-balance arm 37 is removed and an extremely small wire 38 of very fine balance is secured thereto (see Fig. 6). The wire 38 will function as the contacting means for engaging the conducting fluid contained in receptacle 21 when certain conditions are reached as will be discussed more fully hereinafter. The wire 38 must be electrically conducting and must be one that will not react or be attacked by the fluid in receptacle 21. For example, if mercury is employed, the wire 38 must be one that will not amalgamate with the mercury or be attacked by it. Moreover, the wire 38 must be of an extremely fine gauge such that it will easily pass through the orifice 24 of the receptacle 21 and yet be of sufficient strength that it will maintain its position with respect to the indicating arm 36 of the voltmeter 30 at all times. Fine piano wire is a metal wire satisfying these requirements. Of course, it is to be understood that in the replacement of the counter-weight on the right arm portion of the counter-balance with the wire 38, the indicating arm 36 must still be maintained in proper balance. Thus the wire 38 will not only serve as a contact-making means, but will also function as a counter-balance.

In employing the control device 10 with an indicating instrument that does not possess a counter-balancing arm, it will be necessary to install such an element to the indicating arm of the instrument. This construction will result in an arrangement identical with those instruments which normally carry a counter-balance arm as a standard element.

To mount the control device 10 on the voltmeter 30, dial face studs 33 are removed and the base plate 11 positioned against the dial face 32 with the openings 13 being in alignment with the openings of the dial face 32 which normally receive the dial face studs 33. Dial face studs 33 are then re-inserted leaving the base plate 11 in tight engagement with the dial face 32. This mounting must be such that the pivot point of the index pointer 15 will be in complete alignment with the pivot point of the indicating arm 36 of the voltmeter 30. In order for the control device to accurately work as an indicating instrument, the pivotal point of the index pointer 15 and the indicating arm 36 must pivot on the same axis line.

An electrical wire 39 is then secured at one end to the terminal contact stud 29 of the cap 25 with the opposite end being secured to the dial face stud 33 on the righthand side of the dial face 32. The righthand dial face stud 33 has been electrically connected to actuate an actuating means 40 such as, for example, a relay or switch, this being shown by dotted lines in Fig. 5. Of course, it is to be clearly understood that wire 39 could be secured to a new contact installed for this purpose which would then be in turn electrically connected to a relay or switch, or the like, to perform any necessary operation as will be discussed more fully hereinafter.

After the mounting has been accomplished, the index pointer 15 and the indicating arm 36 are placed in alignment. The wire 38 is then bent and shaped so that it will freely pass through the orifice 24 of the receptacle 21 and well into the body of the fluid contained therein. The control device 10 is now ready for use.

With respect to the wire 38, it should be noted that its free end which will come into contact with the fluid in the receptacle 20 may be so formed as to permit a variety of switching effects, dependent upon the effect desired. For example, when mercury is employed, the free end of the wire 38 may be pointed or rounded which would result in the creation of an instantaneous or snap-action effect since the surface tension and capillary action of the mercury will permit the sharp or rounded point to readily engage and disengage the body of the mercury.

If a time delay or slow action is desired, the free end of a wire 38 should be substantially square. With this construction, the wire 38 will push against the surface of the mercury and will tend to deflate it prior to its breaking the surface thereof. Similarly, when the wire 38 is disengaging the mercury the capillary attraction of the mercury for the blunted end will not permit an instantaneous withdrawal and disengagement of the wire 38 from the mercury. Thus with this latter construction a wider band-width of control is possible.

In the illustrative embodiment of the invention shown in Figs. 1–6 the control device 10 is to be employed to regulate, supervise and control the maximum voltage output of a power system so that it will not exceed the maximum permitted under the law. There is no one specific permissible maximum voltage output set by the several states but will vary in accordance with the type and number of consumers of any particular state. The State of North Carolina has set 128 volts as a maximum voltage output for power systems within its jurisdiction and such value will be employed hereinafter as a typical one.

In the utilization of the present invention to perform its intended function, the voltmeter 30 having the control device 10 mounted thereon as hereinbefore described, is placed in the power system in its normal position to indicate the voltage output. The relay or switching means (not shown) to effect the operation of the voltage regulating apparatus (not shown) when excesssive voltage tends to pass into the system is electrically connected on one side to the control device 10 as hereinbefore indicated and on the other side to the voltage regulating apparatus. The index pointer 15 of the control device 10 is then manually turned to the 128 volt reading of the voltmeter 30 and the power system put into operation. Such operation will continue with the voltmeter 30 indicating the actual voltage output of the system at all times. However, upon the occurrence of one or more of the conditions in the system, as previously discussed, which would result in the voltage output exceeding the value of 128, the indicating arm 36 of the voltmeter 30 begins to rise and approaches the 128 volt reading. As indicating arm 36 approaches such a value, the wire 38 secured to the counterbalance arm likewise approaches the orifice 24 of the fluid receptacle 21. When the indicating arm 36 reaches 128 volts it is then in virtual alignment with the index pointer 15 and at the same time the wire 38 has entered the orifice 24 of the fluid receptacle 21 and has contacted the mercury or other fluid contained therein. This operation has resulted in the closing of an electrical circuit between the actual voltage output side of the system and the relay or switching means. The switching means will then actuate the voltage regulating apparatus which will in turn lower the voltage output thus preventing the passing off of more than 128 volts into the system. When the voltage regulating apparatus has lowered the voltage output in the power system below 128 volts, the indicating arm 36 will correspondingly fall to the actual voltage output in the system. This action will place the indicating arm 36 out of alignment with the index pointer 15 thus resulting in the wire 38 carried by the indicating arm 36 to disengage the surface of the conducting fluid contained within the receptacle 21 thus breaking the electrical circuit and throwing the control device 10 out of operation.

An important feature of the present invention is the fact that the control device 10 is a low-burden instrument. That is to say, that the actuation of the control device of the present invention is accomplished with virtually no current being required. This characteristic is extremely important since it will not tend to be economically disadvantageous and also will not be operationally disadvantageous in that it will have no tendency to disrupt the system in which it is employed. In contradistinction, most prior devices of this character tend to be of the high-burden type which results in economical and operational disadvantages.

Referring now to Figs. 7–11, a modified form of the invention is shown in which different means for mounting a control device is made in accordance with the present invention and also a fluid receptacle of a different construction are shown. This modified form of the invention thus indicates that there are a variety of ways of practicing the present invention without following the illustrative modes of construction shown herein.

The modified form of the control device 41 comprises a base plate 42 having openings 43 at each end thereof for mounting the control device 41 to a conventional indicating instrument or meter. The length of the base plate 42 and the positioning of the openings 43 therein must be such that the openings 43 can be mounted directly on existing studs found on the conventional meter, or other indicating instrument, in a manner hereinafter more particularly described in connection with the mounting of the control device 41 to the meter.

One end of the base plate 42 is provided with an integral middle section extending outwardly therefrom and at right angles thereto. Secured to the free end of the middle section 44 is an arcuate upwardly extending and inwardly curved arm section 45, the upper free end of the arm section 45 being provided with an opening 46 in which the index pointer 47 is to be mounted for movement therein. This construction results in the arm section 45 being outwardly off-set from the base plate 42 in order to permit the proper rotation of the index pointer 47 and its associated parts.

The index pointer 47 is mounted within the opening 46 of the arm 45 by means of a set screw 48 and a washer 49. Set screw 48 and the washer 49 are of identical construction as the set screw 16 and 18 respectively described hereinbefore in connection with the form of the invention shown in Figs. 1–8 and will likewise perform the same function and in the same manner. The construction of the arm 45 and the positioning of the opening 46 within which the index pointer 47 is mounted must be such as to place the pivot point of the index pointer 47 in alignment with the pivot point of the indicating arm or pointer of the indicating instrument on which the control device 41 is to be mounted.

An index pointer arm 50 is secured to the bottom end of the index pointer 47 and extends outwardly therefrom at right angles thereto. Adjacent the free end of the index arm 50 is an opening 51 into which a fluid receptacle 52 is positioned in firm engagement therewith. The fluid receptacle 52 may be made of any suitable material such as hereinbefore described in connection with the fluid receptacle 21 employed in the form of the invention shown in Figs. 1–8. The fluid receptacle 52 comprises a cylindrical main body section 53 of a circumference slightly larger than the opening 51 of the index arm 50 since it is to be retained therein by a friction fit. The main body section 53 is to be filled with a current-conducting fluid such as mercury as hereinbefore described. The front face of the fluid receptacle 52 is provided with a small central opening 54 by which the mercury or other conducting fluid is injected into the main body section 53. The size of the opening 54 must be extremely small in order to prevent any of the fluid contained therein from leaking out or otherwise escaping. The mercury can be introduced through the opening 54 of the fluid receptacle 52 by a hypodermic needle or the like.

The main body section 53 is further provided with an opening 55 through which a fine wire will pass to engage the surface of the mercury as hereinbefore described. The size of the orifice 55 must meet with all the requirements heretofore given for the orifice 24 of the fluid receptacle 21 described in conjunction with the form of the invention shown in Figs. 1–8. The main body section 53 of the fluid receptacle 52 is additionally provided with another opening into which an electrical contact screw 56 is positioned. The contact screw 56 will serve the function of electrically connecting the control device 41 to a switching means or other control means to prevent the actuation of the mechanism or the like under control from exceeding a predetermined limit. It will often be found advantageous in the actuation of the control device 41 when mounted on the meter to provide breaking or stop means for the indicating arm of the meter when the control device 41 is in operation. This is accomplished by providing a centrally positioned cylindrical arm 57 on the rear face of the main body section 53. This stop arm 57 will provide the required arresting of the indicator arm of the meter with which the control device 41 is in operation.

The control device 41 is to be used in conjunction with a typical meter 60 which is of the same general construction as the voltmeter 30 hereinbefore described. The meter 60 includes an indicating arm 61 which functions to give a numerical value of the state of the mechanism with which the meter is associated. Additionally, the indicating arm 61 is provided with a counter-balance 62. The voltmeter 60 also is provided with spaced mounting studs 63 adjacent its bottom perimetral edge and functions as the support means for the jewel movement of the indicating arm 61. To mount the control device 41, the dial face of the meter 60 is removed and a small opening is drilled therein, the opening being in alignment with the pivotal point or axis of the indicating arm 61 hereinbefore described in connection with the first form of the invention. The nuts 64 of the mounting studs 63 are removed and the base plate 42 of the control device 41 then connected to the studs 63 by means of the spaced openings 43. The nut 64 is then replaced thus locking the control device 41 intto position with the index pointer 47 pivoting on a point in spaced alignment with the pivotal point of the indicating arm 61. The righthand side of the counterbalance 62 of the indicating arm 61 is provided with a contact wire 65 as hereinbefore described in connection with the mounting of the control device 10 in the first form of the invention shown in Figs. 1–8. The contact stud 56 is then electrically connected to the righthand dial face stud 66 by means of wire 67. The righthand dial face stud is electrically connected to switching means or the like as hereinbefore described in conjunction with the first form of the invention. The dial face of the meter 60 is then replaced with the set screw 48 extending through the drilled opening of the dial face and the washer 49 secured thereto. The meter 60 carrying the control device 41 is then ready for operation and the function of the control device 41 is identical with that of the first form of the invention shown in Figs. 1–6. Thus, when the meter indicating arm 61 is in alignment with the index pointer 47 set at a predetermined value, the contact wire 65 will enter the orifice 55 of the fluid receptacle 52 thus closing the electrical circuit and starting the switching means into operation to effect the desired control of the system.

Figure 13:
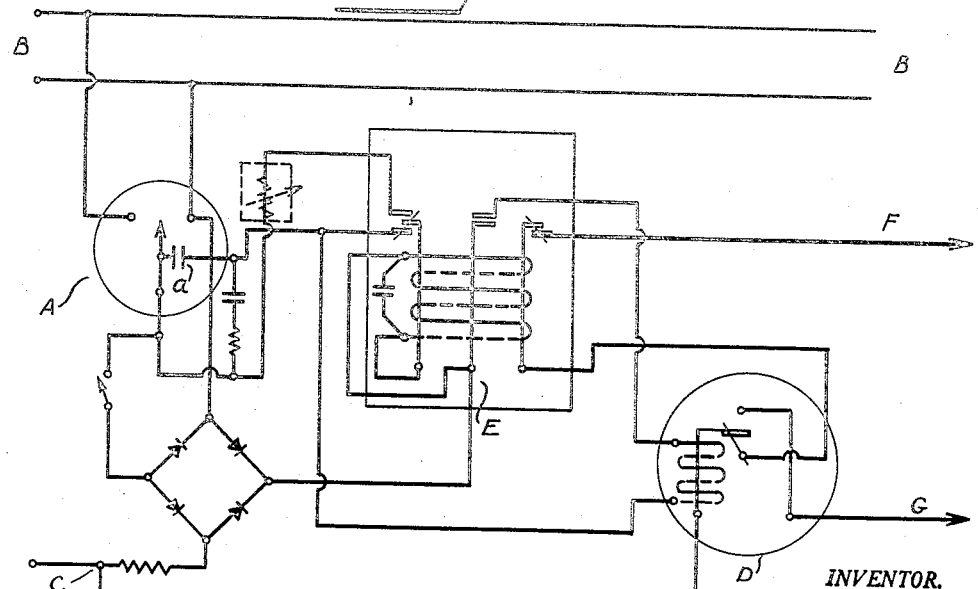
Fig. 13 is a schematic wiring diagram illustrating the operation of the control device made in accordance with the present invention to prevent excessive current overload in a power system.

The actual operation of the control device shown in Fig. 5 to effect the voltage output supervision to prevent it from exceeding a predetermined maximum limit is shown schematically in Fig. 13. The schematic wiring diagram in Fig. 13 includes a voltmeter generally designated by reference numeral A and having a control device made in accordance with the present invention mounted thereon. The voltmeter A is connected on one side to a 110-volt line B and on the other to the voltage output side of the system at C. The voltage output side C is connected also to a low energy contact relay D which in turn is connected to a low energy contact relay E. The low energy relay E is in turn connected to the voltmeter A. The control device contact $a$ is electrically connected to both relays D and E with the circuit normally being open and out of operation. The relay E is connected to a voltage regulator by line F which serves the purpose of raising the voltage output. The relay D is connected to the voltage regulating apparatus by line G for the purpose of lowering the voltage output. The voltage regulating apparatus may be a reversing motor which may raise or lower the voltage output depending upon the conditions of the systems.

When the system is placed in operation, the voltage output or current will pass from C to the low energy relay D. The contact of relay D is normally closed and the current or voltage will then continue to the relay E which will then excite the closed contact of the relay E leading through line F to the voltage regulating apparatus. This will result in a raising of the voltage by the voltage regulating apparatus.

However, if conditions in the system result in a voltage output of 128 volts, the indicating arm of the voltmeter A will then make contact with $a$. This operation results in the closing of the normally open circuit which then effects the picking up of the normally closed contact of relay E leading to the voltage raising side and seals same in open position. When this occurs, current is impressed on both sides of the low energy relay D causing line G to be opened thus setting the voltage lowering mechanism into operation. With the lowering operation being effected, the indicating arm of voltmeter A will fall off thus breaking the contact $a$ and opening the circuit. When this is effected relay D will drop out thus cutting line G out of operation. Relay E will remain in closed position until line C calls for more voltage. When C calls for more voltage, the relay E will then open the line F to effect the raising of the voltage. The normal operation of the system when "lined out" is to have both lines F and G in closed position.

The present invention has been found to be of great utility for automatically switching capacitor banks which respond to current, voltage and time delay. This operation is schematically illustrated in Fig. 12.

Referring now to Fig. 12, the diagram shown therein includes two ammeters $A^1$ and $A^2$ which are connected in series to the secondary transformer of the current circuit C. The necessity of employing both ammeters $A^1$ and $A^2$ is to permit the setting at a low range and a high range of operation thus giving a differential or band control. This arrangement prevents switching out of the capacitors for small dips in current which is a common occurrence in power transmission. Each of the ammeters $A^1$ and $A^2$ have mounted thereon a control device such as that shown in Figs. 1–4 with the setting of the control on $A^1$ being for the low range. Correspondingly, the setting of the control device for $A^2$ will be for the high range. This arrangement therefore will result in the opening of the switch S when the current drops below the setting of $A^1$.

It will be found necessary to also provide a voltmeter B for switching the capacitors. The voltmeter B has a control device made in accordance with the present invention mounted thereon as illustrated in Figs. 5–7 with the setting of the index pointer at the maximum permissible voltage output possible under the law. The importance of providing voltage control cannot be overemphasized since operating conditions often exist in power transmission which results in the current being sufficiently high to switch on the capacitors but such switching would result in raising the system voltage well in excess of that permitted. One common condition that would result in such excessive system voltage by current control alone occurs on week-ends in industrial areas. On week-ends, a great many industrial and other manufacturing companies are not in operation which results in a very high system voltage existing. Thus if the capacitors were switched alone by the current it would result in an excessively high system voltage which would be likely to damage customers' electrical appliances and the like. Thus by incorporating a voltmeter having a control device of the present invention mounted thereon in the capacitor switching system prevents such an occurrence. The voltmeter B is connected to a 110-volt source which has been reduced to this level by means of a power transformer.

It will be found further desirable to have the switching means capable of operation either automatically or manually. This is accomplished by providing a toggle switch S which permits either automatic operation or manual operation. Under most circumstances the toggle switch S will be maintained in automatic operating conditions and in the ensuing description the operation will be described as set for automatic operation.

In the operation of the wiring diagram shown in Fig. 12 the switch S, as indicated, is placed in automatic position to permit the control circuit to function automatically. With the control circuit in this position, thus when the current falls below the current setting of $A^1$ the contacts of $A^1$ and $A^2$, which are the mercury contacts hereinbefore described, are thus closed. The current then passes through the contact of a low energy relay B which is normally closed and the current then passes to the heater on a time delay relay C. After a time delay, i. e. 45 seconds, corresponding to the delay setting of the relay C, the current in turn closes contact of relay D which in turn will energize the closing circuit E to the capacitor switch. At the same time, this operation will result in the sealing in of the mercury contact of $A^2$ so that it will not cut out. This is necessary in order to prevent the relay B from dropping out until ammeter $A^1$ opens. When the current is built up by the bank of capacitors, the mercury contact of $A^1$ will open thus breaking the circuit and throwing the capacitor switching circuit out of operation.

To switch the capacitors when the voltage reaches a predetermined maximum limit, a voltmeter F having the control device $f$ of the present invention mounted thereon, is positioned in the circuit directly across the voltage regulating circuit with the control device $f$ electrically connected on one side to low energy relay B. When the voltage reaches the predetermined maximum level, i. e. 128 volts, the contact of the control device $f$ closes which then energizes the low energy relay B which in turn opens its normally closed contact $b$. With the opening of the contact $b$ of relay B the contact $b'$ is then simultaneously closed. This seals in the relay B through a variable resistor R which has been set at a predetermined voltage band. With the sealing in of low energy relay B the heater C is deenergized causing contact D to close. The closing of the contact D energizes relay H which opens the contact of relay E to the closing circuit, at the same time closing the contact J to the tripping circuit K. If it is desired to operate the circuit solely on voltage in order to switch the capacitors a jumper L, as shown, may be positioned in the circuit which would by-pass the ammeters $A^1$ and $A^2$.

In the description given hereinbefore with respect to the uses of the control device made in accordance with the present invention, such use has been described only with one control device per recording instrument. However, it is to be emphasized that two control devices may be incorporated on the same instrument to provide a control for both a minimum value as well as a maximum value. This can be accomplished, for example, by mounting a second index pointer in the same manner at the first index pointer and providing a second mercury contact chamber thereon. The lefthand arm of the counter balance of the indicating pointer of the instrument may carry the contact wire. Thus the indicating pointer of the meter will engage the first mercury contact for the high value and will contact the second mercury contact for the low value.

It cannot be over-emphasized that the basic invention of this application is the control per se. The discussion had hereinbefore with respect to two illustrative uses of the invention is illustrative in character only. The control device may be employed with a wide variety of indicating instruments of all types in which a maximum upper predetermined limit of value is desired. Such devices may be those indicators indicating revolutions per minute of any type machine, thermocouples and related instruments indicating heat or cold. These are only illustrative of the many uses for which the present invention may be employed.

I claim:

1. A control device for use in combination with an indicating instrument of the type having a movable indicating arm, comprising a counterbalancing arm on said indicating arm, a fine wire mounted at one end adjacent one end of said counterbalancing arm, mounting means, indexing means carried by said mounting means in movable relationship thereto, a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

2. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, index pointer means mounted for pivotal movement on said base support, an apertured arm connected to said index pointer means, and a fluid receptacle mounted within the aperture of said arm, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

3. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, a portion of said base support being offset outwardly, index pointer means mounted for pivotal movement on the offset portion of said base support, and a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

4. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, a portion of said base support being offset outwardly, index pointer means mounted for pivotal movement on the offset portion of said base support, an apertured arm connected to said index pointer means, and a fluid receptacle mounted within the aperture of said arm, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

5. A control device for use in combination with an indicating instrument of the type having a movable indicating arm, comprising a counterbalancing arm on said indicating arm, a fine wire mounted at one end adjacent one end of said counterbalancing arm, mounting means, indexing means carried by said mounting means in movable relationship thereto, a fluid receptacle carried by said indexing means, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

6. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, index pointer means mounted for pivotal movement on said base support, an apertured arm connected to said index pointer means, and a fluid receptacle mounted within the aperture of said arm, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

7. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, a portion of said base support being offset outwardly, index pointer means mounted for pivotal movement on the offset portion of said base support, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

8. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, index pointer means centrally mounted for pivotal movement on said base support, an apertured arm connected at right angles to said index pointer means, and a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

9. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, index pointer means centrally mounted for pivotal movement on said base support, an apertured arm connected at right angles to said index pointer means, a fluid receptacle carried by said indexing means, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

10. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, index pointer means centrally mounted for pivotal movement on said base support, an apertured arm connected at right angles to said index pointer means adjacent its lower end, and a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

11. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, index pointer means centrally mounted for pivotal movement on said base support, an apertured arm connected at right angles to said index pointer means adjacent its lower end, a fluid receptacle carried by said indexing means, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

12. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, said base support being provided with a centrally positioned aperture, index pointer means having an aperture adjacent its lower end thereof connected for pivotal movement thereon by connecting means positioned in said apertures, an apertured arm connected to said index pointer means, and a fluid receptacle mounted within the aperture of said arm, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

13. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, said base support being provided with a centrally positioned aperture, index pointer means having an aperture adjacent its lower end thereof connected for pivotal movement thereon by connecting means positioned in said apertures, said connecting means having an elongated free end extending outwardly therefrom for rotating said index pointer means, an apertured arm connected to said index pointer means, and a fluid receptacle mounted within the aperture of said arm, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

14. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, said base support being provided with a centrally positioned aperture, index pointer means having an aperture adjacent its lower end thereof connected for pivotal movement thereon by connecting means positioned in said apertures, a fluid receptacle carried by said indexing means, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

15. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, said base support being provided with a centrally positioned aperture, index pointer means having an aperture adjacent its lower end thereof connected for pivotal movement thereon by connecting means positioned in said apertures, an apertured arm connected at right angles to said index pointer means, and a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

16. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, said base support being provided with a centrally positioned aperture, index pointer means having an aperture adjacent its lower end thereof connected for pivotal movement thereon by connecting means positioned in said apertures, said connecting means having an elongated free end extending outwardly therefrom for rotating said index pointer means, an apertured arm connected at right angles to said index pointer means, and a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

17. A control device for use in combination with an indicating instrument of the type having a movable indicating arm comprising a counterbalancing arm on said indicating arm, a fine wire mounted at one end adjacent one end of said counterbalancing arm, a base support adapted to be mounted on an instrument, an arcuate arm member secured to one end of said base support, index pointer means carried by the free end of said arm member in pivotal relationship, and a fluid receptacle carried by said indexing means, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

18. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, an arcuate arm member secured to one end of said base support, index pointer means carried by the free end of said arm member in pivotal relationship, an apertured arm connected to said index pointer means, and a fluid receptacle mounted within the aperture of said arm, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

19. A control device for use in combination with an indicating instrument of the type having a movable indicating arm comprising a counterbalancing arm on said indicating arm, a fine wire mounted at one end adjacent one end of said counterbalancing arm, a base support adapted to be mounted on an instrument, an arcuate arm member secured to one end of said base support, index pointer means carried by the free end of said arm member in pivotal relationship, an apertured arm connected to said index pointer means, and a fluid receptacle mounted within the aperture of said arm, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

20. A control device for use in combination with an indicating instrument of the type having a movable indicating arm, comprising a counterbalancing arm on said indicating arm, a fine wire mounted at one end adjacent one end of said counterbalancing arm, a base support adapted to be mounted on an instrument, an arcuate arm member secured to one end of said base support, the upper free end of said arm member being provided with an aperture, index pointer means pivotally mounted to the apertured end of said arm member, connecting means securing said index pointer means to said arm member, said connecting means having an elongated free end extending outwardly therefrom for rotating said index pointer means, an apertured arm connected to said index pointer means, and a fluid receptacle mounted within the aperture of said arm, electrical contact means carried by said receptacle, said fluid receptacle provided with a minute opening for receiving the fine wire carried by an indicating arm of the instrument when said indexing means and said indicating arm are in substantial alignment with one another, the size of such opening being sufficient to permit entry of the fine wire but insufficient to permit the escape of fluid that may be present in said receptacle.

21. The combination of an indicating instrument and a control device comprising an instrument casing, condition responsive means within said casing, indicating means connected to and actuated by said responsive means, a base support mounted on the instrument in close proximity to and spaced from said indicating means, index pointer means pivotally mounted on said base support, fluid receptacle means carried by said index pointer means, electrical conducting fluid within said receptacle, said receptacle provided with an orifice of a size insufficient to prevent the escape of fluid therethrough, electrical contact means carried by said receptacle and in contact with the fluid contained therein, and electrical conducting means carried by said indicating means, said conducting means having a free end capable of entering the orifice in said fluid receptacle, when said indicating means and said index pointer means are in alignment with one another.

22. The combination in accordance with claim 21 in which the base support is mounted to the instrument on the mounting means of the indicating means.

23. The combination in accordance with claim 21 in which the indicating instrument is provided with a dial face and the securing means therefor and the base support is mounted to said securing means.

References Cited in the file of this patent

UNITED STATES PATENTS

| | | |
|---|---|---|
| 396,940 | Knowles | Jan. 29, 1889 |
| 942,497 | Harris | Dec. 7, 1909 |
| 1,042,244 | Macklin | Oct. 22, 1912 |
| 1,196,541 | Hagood | Aug. 29, 1916 |
| 1,289,637 | Bruce | Dec. 31, 1918 |
| 1,352,310 | Olson | Sept. 7, 1920 |
| 1,785,761 | Brown | Dec. 23, 1830 |
| 1,879,388 | Mershon | Sept. 27, 1932 |
| 2,044,882 | Howard | June 23, 1936 |
| 2,068,065 | Neubert | Jan. 19, 1937 |
| 2,230,711 | Yon | Feb. 4, 1941 |
| 2,295,388 | Cuttino | Sept. 8, 1942 |
| 2,407,154 | Hildebrand et al. | Sept. 3, 1946 |
| 2,462,566 | Smith | Feb. 22, 1948 |
| 2,524,340 | Bolin | Oct. 3, 1950 |
| 2,570,125 | Hoare et al. | Oct. 2, 1951 |
| 2,598,847 | Snell | June 3, 1952 |

FOREIGN PATENTS

| | | |
|---|---|---|
| 247,686 | Germany | June 5, 1912 |